US012100828B2

(12) United States Patent
Sadoway

(10) Patent No.: US 12,100,828 B2
(45) Date of Patent: Sep. 24, 2024

(54) MICROSCOPICALLY SMOOTH SUBSTRATES FOR LITHIUM METAL DEPOSITION

(71) Applicant: Pure Lithium Corporation, Charlestown, MA (US)

(72) Inventor: Donald R. Sadoway, Cambridge, MA (US)

(73) Assignee: Pure Lithium Corporation, Charlestown, MA (US)

( * ) Notice: Subject to any disclaimer, the term of this patent is extended or adjusted under 35 U.S.C. 154(b) by 308 days.

(21) Appl. No.: 17/581,517

(22) Filed: Jan. 21, 2022

(65) Prior Publication Data

US 2022/0246901 A1 Aug. 4, 2022

Related U.S. Application Data

(60) Provisional application No. 63/143,178, filed on Jan. 29, 2021.

(51) Int. Cl.
*H01M 4/04* (2006.01)
*C25D 1/04* (2006.01)
(Continued)

(52) U.S. Cl.
CPC ............ *H01M 4/0452* (2013.01); *C25D 1/04* (2013.01); *C25D 1/20* (2013.01); *H01M 4/134* (2013.01);
(Continued)

(58) Field of Classification Search
CPC ... C25D 5/10; C25D 5/12; C25D 3/42; C25D 3/66; C25D 5/611; C30B 7/12; C30B 9/14; C30B 30/02
See application file for complete search history.

(56) References Cited

U.S. PATENT DOCUMENTS 3,953,234 A 4/1976 Hoffmann
4,009,052 A 2/1977 Whittingham
(Continued)

FOREIGN PATENT DOCUMENTS

CN 110474053 A 11/2019
EP 3547416 A1 10/2019
(Continued)

OTHER PUBLICATIONS

Choudhury et al., A Highly Reversible Room-Temperature Lithium Metal Battery Based on Crosslinked Hairy Nanoparticles. Nature Communications, 9 pages (Dec. 2015).
(Continued)

*Primary Examiner* — Brian W Cohen
(74) *Attorney, Agent, or Firm* — Wilson Sonsini Goodrich & Rosati

(57) ABSTRACT

Methods are proposed for manufacturing dendrite-resistant lithium metal electrodes suitable for incorporation into lithium metal batteries. In an embodiment, the method involves first electroplating a copper sheet onto a surface of a single crystal of silicon, the silicon being doped to form a p-type or an n-type semiconductor, and then further electroplating the copper sheet with lithium metal. The lithium-electroplated copper sheet thus manufactured provides a lithium electrode that is resistant to dendrite formation during cycling of lithium metal batteries when compared to conventionally manufactured lithium electrodes. Methods are further provided of manufacturing lithium sheets by directly electroplating lithium metal onto single crystals of doped silicon, the lithium sheets configured for incorporation into lithium metal electrodes that are resistant to dendrite formation during cycling of lithium metal batteries.

20 Claims, 3 Drawing Sheets

(51) Int. Cl.
  *C25D 1/20* (2006.01)
  *C25D 5/10* (2006.01)
  *C25D 5/12* (2006.01)
  *H01M 4/02* (2006.01)
  *H01M 4/134* (2010.01)
  *H01M 4/1395* (2010.01)

(52) U.S. Cl.
  CPC ............ *H01M 4/1395* (2013.01); *C25D 5/10* (2013.01); *C25D 5/12* (2013.01); *H01M 2004/021* (2013.01); *H01M 2004/027* (2013.01)

(56) References Cited

U.S. PATENT DOCUMENTS

| | | | |
|---|---|---|---|
| 4,405,416 | A | 9/1983 | Raistrick et al. |
| 4,546,055 | A | 10/1985 | Coetzer et al. |
| 4,781,756 | A | 11/1988 | Frianeza-Kullberg et al. |
| 5,558,953 | A * | 9/1996 | Matsui .................... C25D 3/42 429/231.95 |
| 8,999,571 | B2 | 4/2015 | Chiang et al. |
| 9,048,507 | B2 | 6/2015 | Eitouni et al. |
| 9,246,159 | B2 * | 1/2016 | Bahr .................... H01M 4/386 |
| 9,705,167 | B2 | 7/2017 | Khiterer et al. |
| 10,074,839 | B2 | 9/2018 | Hammond-Cunningham et al. |
| 10,090,564 | B2 | 10/2018 | Chung et al. |
| 10,177,366 | B2 | 1/2019 | Swonger et al. |
| 11,251,430 | B2 | 2/2022 | Siu et al. |
| 11,453,948 | B2 | 9/2022 | Gallant et al. |
| 11,588,146 | B2 | 2/2023 | Bodoin |
| 2002/0069278 | A1 | 6/2002 | Forslöw |
| 2002/0069282 | A1 * | 6/2002 | Reisman .............. G06Q 20/382 709/227 |
| 2013/0236764 | A1 | 9/2013 | Hu et al. |
| 2014/0170303 | A1 * | 6/2014 | Rayner .................... C25D 5/48 216/75 |
| 2015/0014184 | A1 | 1/2015 | Swonger |
| 2016/0351889 | A1 | 12/2016 | Swonger et al. |
| 2017/0271639 | A1 | 9/2017 | Yoshima et al. |
| 2018/0097221 | A1 | 4/2018 | Swonger et al. |
| 2018/0198170 | A1 | 7/2018 | Fujita et al. |
| 2018/0371632 | A1 | 12/2018 | Bodoin et al. |
| 2019/0036165 | A1 | 1/2019 | Zhamu et al. |
| 2019/0048483 | A1 | 2/2019 | Swonger et al. |
| 2019/0051885 | A1 | 2/2019 | Swonger et al. |
| 2019/0194373 | A1 | 6/2019 | Ma et al. |
| 2019/0226108 | A1 | 7/2019 | Swonger |
| 2019/0260091 | A1 | 8/2019 | Rho et al. |
| 2019/0273258 | A1 | 9/2019 | Thomas-Alyea et al. |
| 2019/0348668 | A1 | 11/2019 | Kim et al. |
| 2019/0376198 | A1 * | 12/2019 | Dow .................... C25D 3/38 |
| 2020/0002153 | A1 | 1/2020 | Delmas et al. |
| 2020/0086281 | A1 | 3/2020 | Hryn et al. |
| 2020/0087806 | A1 | 3/2020 | Hryn et al. |
| 2020/0091509 | A1 | 3/2020 | Hryn et al. |
| 2020/0136178 | A1 | 4/2020 | Ku et al. |
| 2020/0149174 | A1 | 5/2020 | Swonger |
| 2020/0203705 | A1 | 6/2020 | Swonger et al. |
| 2021/0091433 | A1 | 3/2021 | Hammond et al. |
| 2021/0336274 | A1 | 10/2021 | Jung et al. |
| 2021/0381115 | A1 | 12/2021 | Kang et al. |
| 2022/0069278 | A1 | 3/2022 | Bodoin |
| 2022/0069282 | A1 | 3/2022 | Bodoin |
| 2022/0166021 | A1 | 5/2022 | Siu et al. |
| 2022/0223848 | A1 * | 7/2022 | Sadana .................. H01M 4/366 |
| 2022/0255057 | A1 | 8/2022 | Sadoway |
| 2022/0367849 | A1 | 11/2022 | Sadoway et al. |
| 2022/0367874 | A1 | 11/2022 | Sadoway et al. |
| 2022/0393173 | A1 | 12/2022 | Sadoway et al. |
| 2022/0393234 | A1 | 12/2022 | Sadoway et al. |
| 2022/0416220 | A1 * | 12/2022 | Bobel .................. H01M 4/0404 |
| 2023/0102679 | A1 | 3/2023 | Sadoway et al. |
| 2023/0207779 | A1 | 6/2023 | Bodoin |
| 2023/0395779 | A1 | 12/2023 | Bodoin |

FOREIGN PATENT DOCUMENTS

| | | |
|---|---|---|
| WO | WO-9816960 A2 | 4/1998 |
| WO | WO-0005774 A1 | 2/2000 |
| WO | WO-2019018386 A1 | 1/2019 |
| WO | WO-2022046327 A1 | 3/2022 |
| WO | WO-2022046328 A1 | 3/2022 |
| WO | WO-2022173578 A1 | 8/2022 |
| WO | WO-2022240696 A1 | 11/2022 |
| WO | WO-2022240768 A1 | 11/2022 |
| WO | WO-2022256685 A1 | 12/2022 |
| WO | WO-2022256692 A1 | 12/2022 |
| WO | WO-2023049353 A2 | 3/2023 |

OTHER PUBLICATIONS

Choudhury et al., Designer Interphases for the Lithium-Oxygen Electrochemical Cell. Sci. Adv., Apr. 19, 2017, 11 pages.

Choudhury et al., Electroless Formation of Hybrid Lithium Anodes for Fast Interfacial Ion Transport. Agnew. Chem. Int. Ed. 2017, vol. 56, pp. 13070-13077.

Co-pending U.S. Appl. No. 18/095,844, inventors Sadoway; Donald R. et al., filed Jan. 11, 2023.

Co-pending U.S. Appl. No. 18/236,257, inventor Bodoin; Emilie, filed Aug. 21, 2023.

Gannett et al., Cross-Linking Effects on Performance Metrics of Phenazine-Based Polymer Cathodes. ChemSusChem, 2020, vol. 13, pp. 2428-2435.

Harry et al., "Detection of Subsurface Structures Underneath Dendrites Formed on Cycled Lithium Metal Electrodes", Nature materials, vol. 13, Jan. 2014, pp. 69-73.

Lee et al., Dendrite-Free Lithium Deposition for Lithium Metal Anodes with Interconnected Microsphere Protection. Them. Mater., Jul. 2017, vol. 29, pp. 5906-5914.

Mashtalir et al., High-Purity Lithium Metal Films from Aqueous Mineral Solutions. ACS Omega, 2018, vol. 3, pp. 181-187.

Nakajima et al., Lithium Ion Conductive Glass Ceramics: Properties and Application in Lithium Metal Batteries. Symposium on Energy Storage Beyond Lithium Ion, Oak Ridge National Laboratory, pp. 1-28, Oct. 8, 2010.

Pan et al., "A review of solid-slate lithium-sulfur battery: Ion transport and polysulfide chemistry," Energy Fuels, vol. 34, pp. 11942-11961, Sep. 3, 2020.

PCT/US2021/042694 International Search Report and Written Opinion dated Nov. 4, 2021.

PCT/US2021/042696 International Search Report and Written Opinion dated Nov. 5, 2021.

PCT/US2022/028179 International Search Report and Written Opinion dated Sep. 5, 2022.

PCT/US2022/028380 International Search Report and Written Opinion dated Sep. 12, 2022.

PCT/US2022/032209 International Search Report and Written Opinion dated Oct. 14, 2022.

Qian et al. Dendrite-Free Li Deposition Using Trace-Amounts of Water as an Electrolyte Additive. Nano Energy, 2015, vol. 15, pp. 135-144.

Shi, et al. The Development of Vanadyl Phosphate Cathode Materials for Energy Storage Systems: A Review. Chemistry. Jul. 2, 2020;26(37):8190-8204. doi: 10.1002/chem.201905706. Epub May 11, 2020.

Sigma-Aldrich. Certificate of Analysis. Product Name: Lithium—ribbon, thickness x W 0.38 mm x 23 mm, 99.9% trace metals basis. Product No. 265985. Batch No. SHBM9629. Quality Release Date Jan. 22, 2021. Retrieved online Jul. 23, 2023 at URL: https://www.sigmaaldrich.com/certificates/COFA/26/265985/265985-Bulk_SHBM9629_.pdf.

Sigma-Aldrich. Product Specification Sheet. Product Name: Lithium—ribbon, thickness x W 0.38 mm x 23 mm, 99.9% trace metals basis. Product No. 265985. Retrieved online Jul. 23, 2023 at URL: https://www.sigmaaldrich.com/specification-sheets/221/584/265985-Bulk_Aldrich_.pdf.

(56) References Cited

OTHER PUBLICATIONS

Siu, et al. Enabling multi-electron reaction of ε-VOPO4 to reach theoretical capacity for lithium-ion batteries. Chem Commun (Camb). Jul. 10, 2018;54(56):7802-7805. doi: 10.1039/c8cc02386g.
Stalin et al., Designing Polymeric Interphases for Stable Lithium Metal Deposition. American Chemical Society, Jun. 1, 2020, 10 pages.
Trapa et al., "Block copolymer electrolytes synthesized by atom transfer radical polymerization for solid-slate, thin-film lithium batteries," Electrochemical and Solid State Letters, vol. 5, pp. A85-A88, Feb. 26, 2002.
U.S. Appl. No. 17/006,048 Notice of Allowance dated Nov. 3, 2022.
U.S. Appl. No. 17/006,048 Office Action dated Apr. 7, 2022.
U.S. Appl. No. 17/006,073 Office Action dated May 4, 2023.
U.S. Appl. No. 17/006,073 Office Action dated Nov. 10, 2022.
U.S. Appl. No. 18/236,257 Office Action dated Oct. 23, 2023.
Whittingham, et al. Can Multielectron Intercalation Reactions Be the Basis of Next Generation Batteries? Acc Chem Res. Feb. 20, 2018;51(2):258-264. doi: 10.1021/acs.accounts.7b00527. Epub Jan. 12, 2018.
Zhang, et al. Pushing the limit of 3d transition metal-based layered oxides that use both cation and anion redox for energy storage. Nat Rev Mater 7, 522-540 (2022). https://doi.org/10.1038/s41578-022-00416-1.
Zhao et al., Solid-State Polymer Electrolytes with In-Built Fast Interfacial Transport for Secondary Lithium Batteries.—Nature Energy, vol. 4, May 2019, pp. 365-373.
U.S. Appl. No. 17/006,073 Requirement for Restriction dated Jul. 27, 2022.
U.S. Appl. No. 17/738,798 Office Action dated Feb. 20, 2024.

\* cited by examiner

MICROSCOPICALLY SMOOTH SUBSTRATES FOR LITHIUM METAL DEPOSITION

CROSS-REFERENCE TO RELATED APPLICATIONS

This patent application claims the benefit of U.S. Provisional Patent Application No. 63/143,178 filed Jan. 29, 2021, the disclosure of which is incorporated by reference herein in its entirety.

TECHNICAL FIELD

The present invention relates to compositions and methods of producing microscopically smooth conductive substrates suitable for lithium metal electrodes. In particular, microscopically smooth copper substrates provide surfaces suitable for electrodepositing lithium metal to provide microscopically smooth lithium metal electrodes for lithium metal batteries.

BACKGROUND ART

Lithium metal batteries have intrinsically higher capacity than lithium-ion batteries, and are thus the preferred technology for primary batteries. However, rechargeable lithium metal batteries tend to form dendrites on the lithium metal electrode, which can short batteries, leading to reduced battery life and the potential for hazardous combustion.

Lithium metal electrodes comprise a flat electronically conductive substrate, typically copper, that functions as the current collector of the negative electrode, onto which lithium metal is deposited.

In part, dendrite formation results from a lack of uniform contact between the conductive substrate and electrolytically deposited lithium metal. If the lithium metal deposited is not in uniform contact with the conductive substrate, this can lead to an uneven distribution of current during the electrolytic process, which can in turn lead to an uneven distribution of deposited lithium, and eventually can promote dendrite formation. Microscopically smooth conductive surfaces provide more uniform contact, which should deter dendrite formation compared to macroscopically rough surfaces. A need exists for inexpensive methods to provide microscopically smooth conductive surfaces suitable for lithium metal batteries. A specific need exists for smooth copper surfaces for metal electrodes, and a particular need exists for microscopically smooth copper surfaces for lithium metal electrodes in rechargeable lithium metal batteries.

SUMMARY OF THE EMBODIMENTS

According to an embodiment of the invention, a method of manufacturing a lithium metal electrode is disclosed that includes the steps of (1) obtaining a single crystal of silicon, doped to increase its electronic conductivity; (2) electroplating a conductive metal onto the surface of the single crystal of silicon, thereby forming a conductive metal substrate having a first face in contact with the single crystal of silicon and a second face, disposed opposite the first face, not in contact with the single crystal of silicon; (3) electroplating a layer of lithium metal onto the second face of the conductive metal substrate, thereby forming the lithium metal electrode comprising the conductive metal substrate and the layer of lithium metal.

In some embodiments, the arithmetic mean roughness $R_a$ of the layer of lithium metal on the second face of the conductive metal substrate is a value less than 0.5 µm. In some embodiments, $R_a$ is a value less than 0.2 µm. In some embodiments, $R_a$ is a value less than 0.1 µm. In some embodiments, $R_a$ is a value less than 0.05 µm.

According to a further embodiment, the conductive metal substrate is lifted from the surface of the single crystal of silicon prior to electroplating a layer of lithium on the first face of the conductive metal substrate and a layer of lithium on the second face of the conductive metal substrate.

In some embodiments, the arithmetic mean roughness $R_a$ of the layer of lithium metal on the first face of the conductive metal substrate is a value less than 0.5 µm. In some embodiments, $R_a$ is a value less than 0.2 µm. In some embodiments, $R_a$ is a value less than 0.1 µm. In some embodiments, $R_a$ is a value less than 0.05 µm.

In some embodiments, the conductive metal is chosen from a group consisting of copper, nickel, silver, gold, lead, cadmium, zinc, and tin. In a preferred embodiment, the conductive metal is copper. In some embodiments, the conductive metal is an alloy. In some embodiments, the conductive metal is an alloy comprising two or more metals selected from the group consisting of copper, nickel, silver, gold, lead, cadmium, zinc, and tin. In some embodiments, the alloy is a stainless steel. In some embodiments, the stainless steel alloy includes iron, nickel, and chromium. In some embodiments, the conductive metal is an alloy comprising copper. In some embodiments, the conductive metal is an alloy comprising copper and one or more precious metals selected from the group consisting of gold, silver, platinum, and palladium. In some embodiments, the conductive metal is an alloy comprising copper and one or more metals selected from the group consisting of nickel, lead, tin, cadmium, and zinc.

In a preferred embodiment, the conductive metal substrate is lifted from the surface of the single crystal of silicon prior to electroplating the conductive metal substrate with lithium metal, thereby forming a lithium metal electrode comprising the conductive metal substrate coated on at least two faces with lithium metal. In some embodiments, the arithmetic mean roughness $R_a$ of the layers of lithium metal is a value less than 0.5 µm. In some embodiments, $R_a$ is a value less than 0.2 µm. In some embodiments, $R_a$ is a value less than 0.1 µm. In some embodiments, $R_a$ is a value less than 0.05 µm.

In some embodiments, the single crystal of silicon is doped to form an n-type semiconductor. In some such embodiments, the single crystal of silicon is doped with an element selected from the group consisting of phosphorous, arsenic, antimony, bismuth, sulfur, selenium, tellurium, and combinations thereof. In some embodiments, the single crystal is doped with an element selected from the group of phosphorous, arsenic, antimony, bismuth, and combinations thereof.

In further embodiments, the single crystal of silicon is doped to form a p-type semiconductor. In some such embodiments, the single crystal of silicon is doped with an element selected from the group consisting of boron, aluminum, gallium, indium, zinc, cadmium, mercury, and combinations thereof. In some such embodiments, the single crystal of silicon is doped with an element selected from the group consisting of boron, aluminum, gallium, indium, and combinations thereof.

In some embodiments, the lithium is electroplated under an inert atmosphere. In a preferred embodiment, the lithium metal is electroplated under an argon atmosphere. In some embodiments, the layer of lithium includes no more than five ppm of non-metallic elements by mass.

In one embodiment of the invention, a method is provided of manufacturing a smooth lithium metal sheet that includes the steps of: (1) obtaining a single crystal of silicon, doped to increase its electronic conductivity; and (2) electroplating lithium onto a surface of the single crystal of silicon, thereby forming a sheet of lithium metal. In some embodiments $R_a$ of the electrodeposited lithium is a value less than 0.5 µm.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

As used in this description and the accompanying claims, the following term shall have the meaning indicated, unless the context otherwise requires:

Dendrite resistant lithium metal electrodes are metal electrodes, coated with lithium, that resist dendrite formation when cycled in a lithium metal battery. Batteries with dendrite resistant lithium metal electrodes resist shorting from negative to positive electrode over the entire life of the battery.

The arithmetic mean roughness Ra of a surface is defined as the arithmetic average deviation of surface valleys and peaks about a center line average.

A microscopically smooth surface is a surface with an arithmetic mean roughness value of less than 0.5 µm, preferably less than 0.2 µm, preferably less than 0.1 µm.

Figure 1:
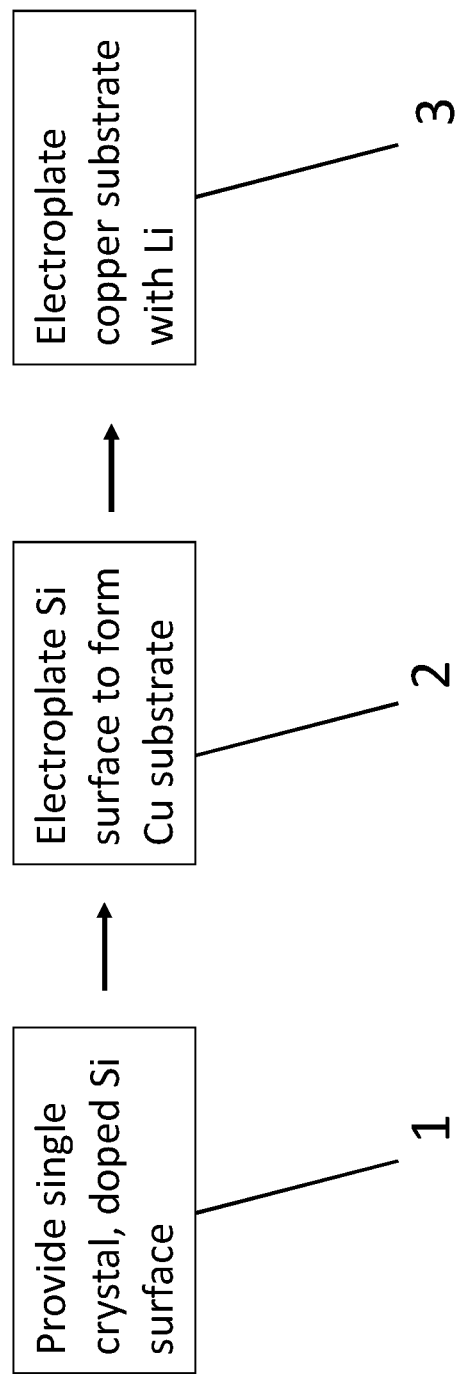
FIG. 1 provides an embodiment of the method for manufacturing a dendrite-resistant lithium metal electrode by a process of first electroplating a doped silicon surface with a copper substrate and then further electroplating a layer of lithium onto the smooth copper substrate, and finally removing the lithium coated copper substrate to provide a dendrite-resistant lithium metal electrode.
Figure 2:
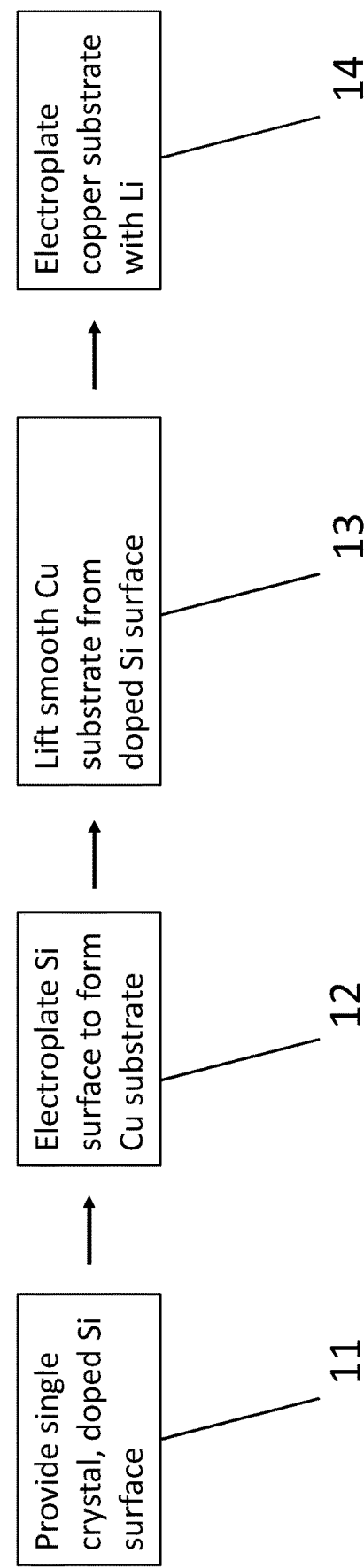
FIG. 2 provides an embodiment of a method for manufacturing a dendrite-resistant lithium metal electrode by first electroplating a doped silicon surface with a copper substrate, then removing the smooth copper substrate, and finally electroplating the copper substrate with lithium metal to form the dendrite-resistant lithium metal electrode.
Figure 3:
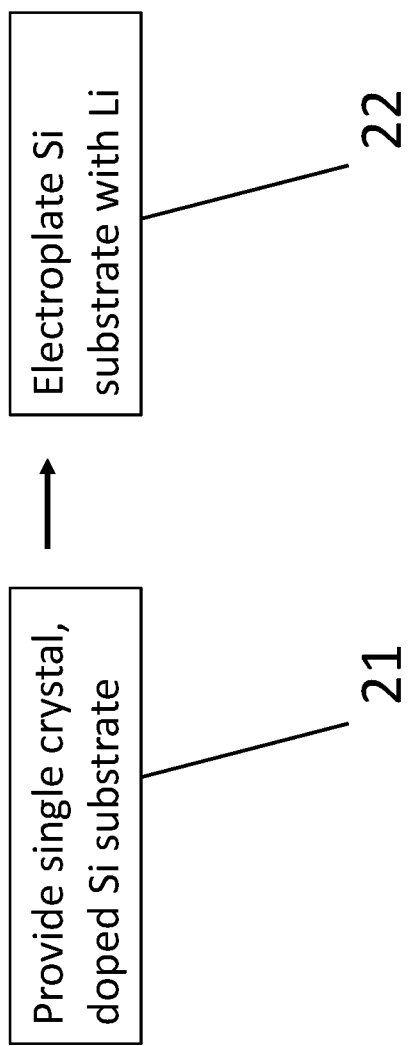
FIG. 3 provides an embodiment of a method for manufacturing a lithium sheet by electroplating lithium metal directly onto a conductive substrate of doped silicon, the sheet being suitable for incorporation into a dendrite-resistant lithium metal electrode.

FIGS. 1-3 provide embodiments of the instant invention. In all embodiments, a single crystal of doped Si is cleaved by standard methods used in the production of silicon wafers to provide a microscopically smooth doped Si surface. In preferred embodiments, the crystal is formed by the Czochralski method.

In some embodiments the dopants are n-dopants. In preferred embodiments, the n-dopants are selected from Group 15 elements. In preferred embodiments, the n-dopants are Group 15 elements selected from the group consisting of phosphorous, arsenic, antimony, bismuth, and combinations thereof.

In some embodiments the dopants are p-dopants. In some embodiments the p-dopants are selected from Group 13 elements. In some embodiments, the p-dopants are Group 13 elements selected from the group consisting of boron, aluminum, gallium, indium, and combinations thereof.

As embodied in FIG. 1, the doped Si crystal 1 is incorporated as a cathode in an electrolytic cell containing salts of copper, and the surface of the doped Si crystal 1 is electrolytically coated with a microscopically smooth surface of copper, thereby providing a copper substrate 2 suitable for lithium deposition. Following this process, the copper coated silicon crystal is incorporated as a cathode in an electrolytic cell containing salts of lithium, and the copper surface is in turn electrolytically coated with a microscopically smooth layer of lithium 3. Following this process, the lithium-coated copper surface can be incorporated as a negative electrode in a lithium metal battery.

In another embodiment, shown in FIG. 2, the doped Si crystal 11 is incorporated as a cathode in an electrolytic cell containing salts of copper, and the surface of the doped Si crystal 11 is electrolytically coated with a microscopically smooth surface of copper, thereby providing a flat copper substrate 12 suitable for lithium deposition. In this embodiment, the copper substrate 12 is lifted from the doped silicon surface 13 and further electroplated with a microscopically smooth layer of lithium. An advantage of the embodiment of FIG. 2 is that the copper substrate can be electroplated on two flat surfaces, whereas the embodiment of FIG. 1 can only be coated on one surface.

According to the embodiment of FIG. 3, a single crystal of doped Si 21 is electroplated directly with lithium metal 22, to form a microscopically smooth lithium metal sheet for incorporation into a lithium metal electrode 23.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of manufacturing a lithium metal electrode comprising:

electroplating a conductive metal onto a surface of a single crystal of silicon, thereby forming a conductive metal substrate, wherein the conductive metal substrate comprises a first face in contact with the single crystal of silicon, and a second face, disposed opposite the first face, not in contact with the single crystal of silicon, wherein the single crystal of silicon is doped to increase its electronic conductivity; and electroplating a layer of lithium metal onto the second face of the conductive metal substrate, thereby forming the lithium metal electrode comprising the conductive metal substrate and the layer of lithium metal coated on the second face of the conductive metal substrate, wherein an arithmetic mean roughness of the layer of lithium metal on the second face of the conductive metal substrate is less than 0.5 micrometer (µm).

2. The method of claim 1, wherein the conductive metal substrate is lifted from the surface of the single crystal of silicon prior to electroplating the conductive metal substrate with lithium metal, so that the conductive metal substrate is electroplated on both of the first face and the second face with the layer of lithium metal, thereby forming the lithium metal electrode comprising the conductive metal substrate and the layer of lithium metal coated on the first face and the second face of the conductive metal substrate, wherein the arithmetic mean roughness of the deposited layer of lithium metal on the first face of the conductive metal substrate is a value less than 0.5 μm.

3. The method of claim 1, wherein the conductive metal is chosen from the group consisting of copper, nickel, silver, gold, lead, cadmium, zinc, and tin.

4. The method of claim 1, wherein the conductive metal is copper.

5. The method of claim 1, wherein the conductive metal is an alloy.

6. The method of claim 5, wherein the alloy comprises two or more metals selected from the group consisting of Cu, Ni, Ag, Au, Pt, Pd, Pb, Cd, Zn, and Sn.

7. The method of claim 5, wherein the alloy is a copper alloy.

8. The method of claim 7, wherein the copper alloy comprises one or more precious metals selected from the group consisting of Ag, Au, Pt, and Pd.

9. The method of claim 7, wherein the copper alloy comprises one or more metals selected from the group consisting of Ni, Pb, Sn, Cd, and Zn.

10. The method of claim 5, wherein the alloy is a stainless steel.

11. The method of claim 10, wherein the stainless steel alloy comprises Fe, Ni, and Cr.

12. The method of claim 1, wherein the single crystal of silicon is doped to form an n-type semiconductor.

13. The method of claim 12, wherein the single crystal of silicon is doped with an element selected from the group consisting of P, As, Sb, Bi, S, Se, Te, and combinations thereof.

14. The method of claim 1, wherein the single crystal of silicon is doped to form a p-type semiconductor.

15. The method of claim 14, wherein the single crystal of silicon is doped with an element selected from the group consisting of B, Al, Ga, In, Zn, Cd, Hg, and combinations thereof.

16. The method of claim 1, wherein the layer of lithium metal is electroplated under an inert atmosphere.

17. The method of claim 16, wherein the inert atmosphere comprises argon.

18. The method of claim 1, wherein the layer of lithium metal comprises no more than five parts-per-million (ppm) of non-metallic elements by mass.

19. The method of claim 1, wherein the arithmetic mean roughness of the layer of lithium metal is less than 0.2 pm.

20. The method of claim 1, wherein the arithmetic mean roughness of the layer of lithium metal is less than 0.1 pm.

* * * * *